United States Patent
Yu et al.

(10) Patent No.: US 11,159,441 B2
(45) Date of Patent: Oct. 26, 2021

(54) QOS/QOE ENFORCEMENT DRIVEN SUB-SERVICE FLOW MANAGEMENT IN 5G SYSTEM

(71) Applicant: Nokia Technologies Oy, Espoo (FI)

(72) Inventors: Ling Yu, Kauniainen (FI); Matti Einari Laitila, Oulu (FI); Peter Szilagyi, Budapest (HU); Csaba Vulkán, Budapest (HU)

(73) Assignee: Nokia Technologies Oy, Espoo (FI)

( * ) Notice: Subject to any disclaimer, the term of this patent is extended or adjusted under 35 U.S.C. 154(b) by 415 days.

(21) Appl. No.: 16/087,887

(22) PCT Filed: Apr. 11, 2016

(86) PCT No.: PCT/US2016/026978
§ 371 (c)(1),
(2) Date: Sep. 24, 2018

(87) PCT Pub. No.: WO2017/180093
PCT Pub. Date: Oct. 19, 2017

(65) Prior Publication Data
US 2020/0304417 A1 Sep. 24, 2020

(51) Int. Cl.
*H04L 12/863* (2013.01)
*H04W 76/11* (2018.01)
(Continued)

(52) U.S. Cl.
CPC .......... *H04L 47/6215* (2013.01); *H04L 47/14* (2013.01); *H04L 47/805* (2013.01); *H04L 67/141* (2013.01); *H04W 76/11* (2018.02)

(58) Field of Classification Search
CPC ... H04L 47/6215; H04L 47/14; H04L 47/805; H04L 67/141; H04L 47/2458;
(Continued)

(56) References Cited

U.S. PATENT DOCUMENTS

| 6,937,566 B1 | 8/2005 | Forslow |
| 9,271,184 B2 | 2/2016 | Raleigh et al. |

(Continued)

FOREIGN PATENT DOCUMENTS

WO 2015/188875 A1 12/2015

OTHER PUBLICATIONS

Gomez et al., "Towards a QoE-Driven Resource Control in LTE and LTE-A Networks", Journal of Computer Networks and Communications, vol. 2013, 2012, 22 pages.

(Continued)

*Primary Examiner* — Ayaz R Sheikh
*Assistant Examiner* — Louis Samara
(74) *Attorney, Agent, or Firm* — Nokia Technologies Oy

(57) ABSTRACT

Methods and apparatus, including computer program products, are provided for QoE/QoS management. In some example embodiments, there may be provided a method. The method may include detecting, by an enforcement point, an initiation of a session of an application; determining, by the enforcement point, whether a new subservice flow needs to be established to enable, for the initiated session, a quality of service differentiation and/or a quality of experience differentiation; sending, by the enforcement point, an indication to a radio to enable the radio to establish a radio buffer to handle the new subservice flow, when the new subservice flow needs to be established; sending, by the enforcement point, parameter information to the radio to enable the radio to configure at least one service parameter of the radio buffer; and forwarding, by the enforcement point, user-plane data associated with the session to the radio including a subservice flow identifier. Related apparatus, systems, methods, and articles are also described.

20 Claims, 12 Drawing Sheets

(51) Int. Cl.
*H04L 12/801* (2013.01)
*H04L 12/927* (2013.01)
*H04L 29/08* (2006.01)

(58) Field of Classification Search
CPC ............ H04L 47/2425; H04L 61/2015; H04L 41/5029; H04L 49/9078; H04L 47/24; H04W 76/11; H04W 28/10; H04W 12/69; H04W 4/08
See application file for complete search history.

(56) References Cited

U.S. PATENT DOCUMENTS

| | | | | |
|---|---|---|---|---|
| 2003/0103460 | A1* | 6/2003 | Kamath | H04W 28/10 370/236.2 |
| 2005/0041696 | A1* | 2/2005 | Pekonen | H04L 49/9078 370/537 |
| 2007/0121542 | A1* | 5/2007 | Lohr | H04L 47/24 370/329 |
| 2012/0047273 | A1 | 2/2012 | Ajero et al. | |
| 2012/0300688 | A1* | 11/2012 | Gholmieh | H04W 4/08 370/312 |
| 2013/0003545 | A1 | 1/2013 | Li | |
| 2014/0126502 | A1* | 5/2014 | Westberg | H04L 47/2458 370/329 |
| 2015/0230152 | A1* | 8/2015 | Raleigh | H04L 41/0896 370/230 |
| 2015/0257012 | A1 | 9/2015 | Zhang | |
| 2016/0344635 | A1* | 11/2016 | Lee | H04L 47/20 |
| 2017/0134954 | A1* | 5/2017 | Speight | H04W 12/065 |
| 2019/0159024 | A1* | 5/2019 | Rost | H04W 12/69 |

OTHER PUBLICATIONS

Akyildiz et al., "SoftAir: A Software Defined Networking Architecture for 5G Wireless Systems", Computer Networks, vol. 85, 2015, pp. 1-18.
Agyapong et al., "Design Considerations for a 5G Network Architecture", IEEE Communications Magazine, vol. 52, No. 11, Nov. 2014, pp. 65-75.
Monserrat et al., "METIS Research Advances towards the 5G Mobile and Wireless System Definition", EURASIP Journal on Wireless Communications and Networking, 2015, 20 pages.
International Search Report and Written Opinion received for corresponding Patent Cooperation Treaty Application No. PCT/US2016/026978, dated Dec. 7, 2016, 11 pages.

* cited by examiner

QOS/QOE ENFORCEMENT DRIVEN SUB-SERVICE FLOW MANAGEMENT IN 5G SYSTEM

RELATED APPLICATION

This application was originally filed as PCT Application No. PCT/US2016/026978 filed Apr. 11, 2016.

FIELD

The subject matter disclosed herein relates to QoS and/or QoE management.

BACKGROUND

Networks use quality of service (QoS) parameters to ensure that certain traffic types are handled in a certain way to provide a certain, threshold amount of QoS. For example, a given traffic flow may be classified by certain, generally static QoS parameters, such as guaranteed bit rate (GBR), non-guaranteed bit rate (non-GBR), priority handling, packet delay budget, packet error loss rate, and/or the other parameters. When a traffic flow has a certain QoS parameter, it may for example be forwarded via a radio bearer that can carry traffic according to the QoS parameter. Quality of Experience (QoE) represents a measure or indication of quality from the perspective of a user. As such, QoE may take into account the overall application or service layer performance of traffic between the application or service at a user equipment to a remote, network server, for example.

SUMMARY

In some example embodiments, there may be provided quality of service and/or quality of experience management.

In some example embodiments, there may be provided a method. The method may include detecting, by an enforcement point, an initiation of a session of an application; determining, by the enforcement point, whether a new subservice flow needs to be established to enable, for the initiated session, a quality of service differentiation and/or a quality of experience differentiation; sending, by the enforcement point, an indication to a radio to enable the radio to establish a radio buffer to handle the new subservice flow, when the new subservice flow needs to be established; sending, by the enforcement point, parameter information to the radio to enable the radio to configure at least one service parameter of the radio buffer; and forwarding, by the enforcement point, user-plane data associated with the session to the radio including a subservice flow identifier.

In some variations, one or more of the features disclosed herein including the following features can optionally be included in any feasible combination. The detecting may include monitoring, by the enforcement point, the user-plane data to detect the initiation of the session of the application. The determining may further include determining whether the session requires a flow treatment that is different from what is available at the radio buffers at the radio and/or from what is provided by the established subservice flows. The enforcement point may send the indication to the radio, when the session requires the flow treatment that is different from what is available at the radio buffers and/or from what is provided by the established subservice flows. The enforcement point may send an indication to the radio to modify an existing radio buffer to handle the new subservice flow, when the session requires a flow treatment that is different from what is available at the radio buffers. The enforcement point may send an indication requesting the radio to terminate the radio buffer serving the session. The enforcement point may send user plane data including a last packet indication to indicate to the radio that the radio buffer serving the session can be terminated. The enforcement point may mark the user plane data of the session to include one or more subservice flow identifiers to enable mapping subservice flows to the radio buffer. The one or more subservice flow identifiers include a unique identity to enable the radio to select one of a plurality or radio buffers to assign the user-plane data of the new subservice flow. The enforcement point may mark the user plane data of the session to include a group identifier indicating to the radio which subservice flows are to be multiplexed together via a same radio buffer. The parameter information may include one or more quality of service parameters and/or one or more quality of experience parameters. The parameter information may be carried to the radio via an in-band user plane interface at the enforcement point. The enforcement point may provide a composite parameter to the radio, wherein the composite parameter provides, for a group of subservice flows, a quality of service and/or a quality of experience parameter for the group of subservice flows.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
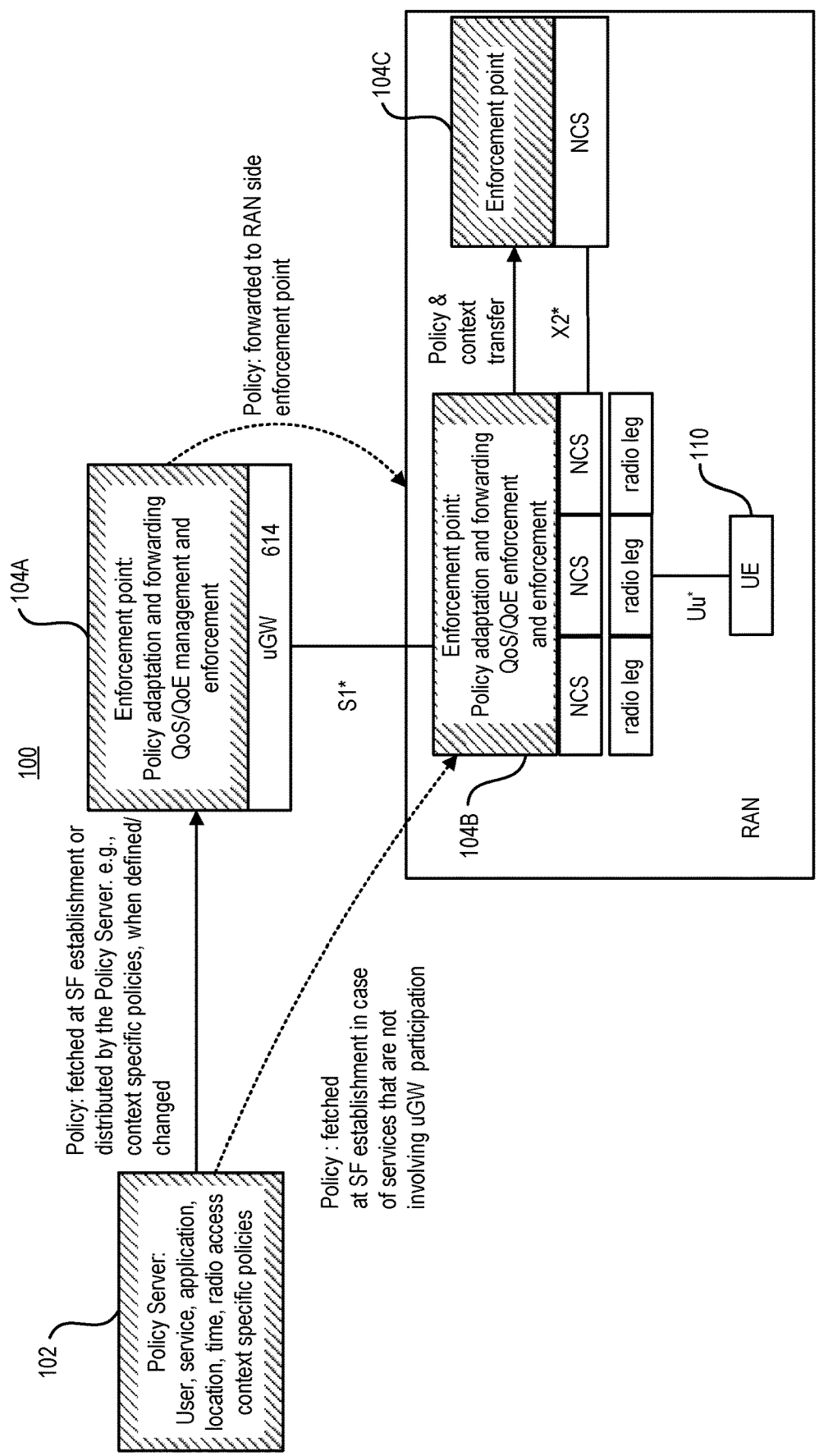
FIG. 1 depicts an example of a QoS/QoE architecture, in accordance with some example embodiments.

Like labels are used to refer to same or similar items in the drawings.

DETAILED DESCRIPTION

Traffic in wireless networks has become more diverse including a broad array of traffic including traffic from applications or services such as vehicle-to-everything (V2E), internet of things (IoT), video streaming, web page downloads, and the like. Moreover, each of these applications or services may have very different demands from the network at any given instant in time. However, simple, static QoS-based approaches may not adequately address the dynamic nature of these applications or services.

In some example embodiments, there may be provided an enforcement point. The enforcement point may, for the sake of more efficient QoS/QoE management, partition the user-plane flows within a service flow into one or more subservice flows. A subservice flow may correspond to one service flow, and the subservice flow may represent a logical separation carrying a subset of the service flow's traffic requiring a certain, dedicated QoS/QoE treatment. The subservice flows may enable a more granular user-plane service and/or flow differentiation below service flow granularity. In some example embodiments, an enforcement point may, for each service or subservice flow, autonomously (based on context information regarding the application, user, state of shared network resources, the traffic itself, and/or the like) define the QoS and/or QoE parameters and values for the customer experience level and network level policies. The autonomous and adaptive parameter definition may be required, when the network operator has not supplied an explicit policy defining the parameters.

FIG. 1 depicts a block diagram of portions of a QoS/QoE framework 100, in accordance with some example embodiments.

The system 100 may include a central policy server 102 and at least one enforcement point 104A-C. The central policy server 102 may store policies associated with applications, services, and/or the like which may be implemented at a user equipment and/or at other network nodes. Specifically, the central policy server 102 may store, for a given application or service, context information (for example, a location of the user equipment, a time, type of radio access, current demand for network resources, current QoS or QoE state of the application or service, and/or the like), specific policies, and/or network operator preferences.

In some example embodiments, an enforcement point, such as enforcement point 104A-C, may manage QoS/QoE by at least adaptively and/or dynamically applying and enforcing policies in the context of actual user plane traffic, services, applications, network status, and/or network resource status. In some example embodiments, the enforcement point may be implemented by the application convergence sub-layer, ACS. The enforcement point may access user plane traffic to collect user, service, application, network-specific context information, execute actions on the traffic itself, and/or control user plane system resources including so-called critical user plane system resources, such as radio bearers, core network resources, transport infrastructure, and/or services.

In some example embodiments, an enforcement point, such as enforcement point 104A-C, may determine (for example, derive) its actions from policies received (or retrieved) from the policy server 102, when a service flow for a given application or service is established. On the user-plane, the enforcement point may handle the traffic of one or more service flows, and the enforcement point may manage the QoE for each service flow.

The policy server 102 may include policy to enable QoS/QoE management, and certain functions, such as a home subscriber server (HSS), subscription profile repository (SPR), and/or policy and charging rules function (PCRF). For example, the policy server may include subscriber information (e.g., the type of user, list of subscribed services, and/or the like) and/or subscription information (e.g., details of the data plan). Alternatively or additionally, the policy server may aggregate policies such as maximum aggregated bitrate the user may use, or when the user traffic is going to be throttled if a certain amount (e.g., 5 GB) or monthly data is used. Moreover, the policy server may have this information on a per subscriber basis. The policies may provide the high-level QoE and/or QoE targets, service boundaries, preferences, and priorities for the QoS/QoE management framework. The dynamic and context based enforcement responsibility may be delegated to the QoS/QoE enforcement points.

Figure 2:
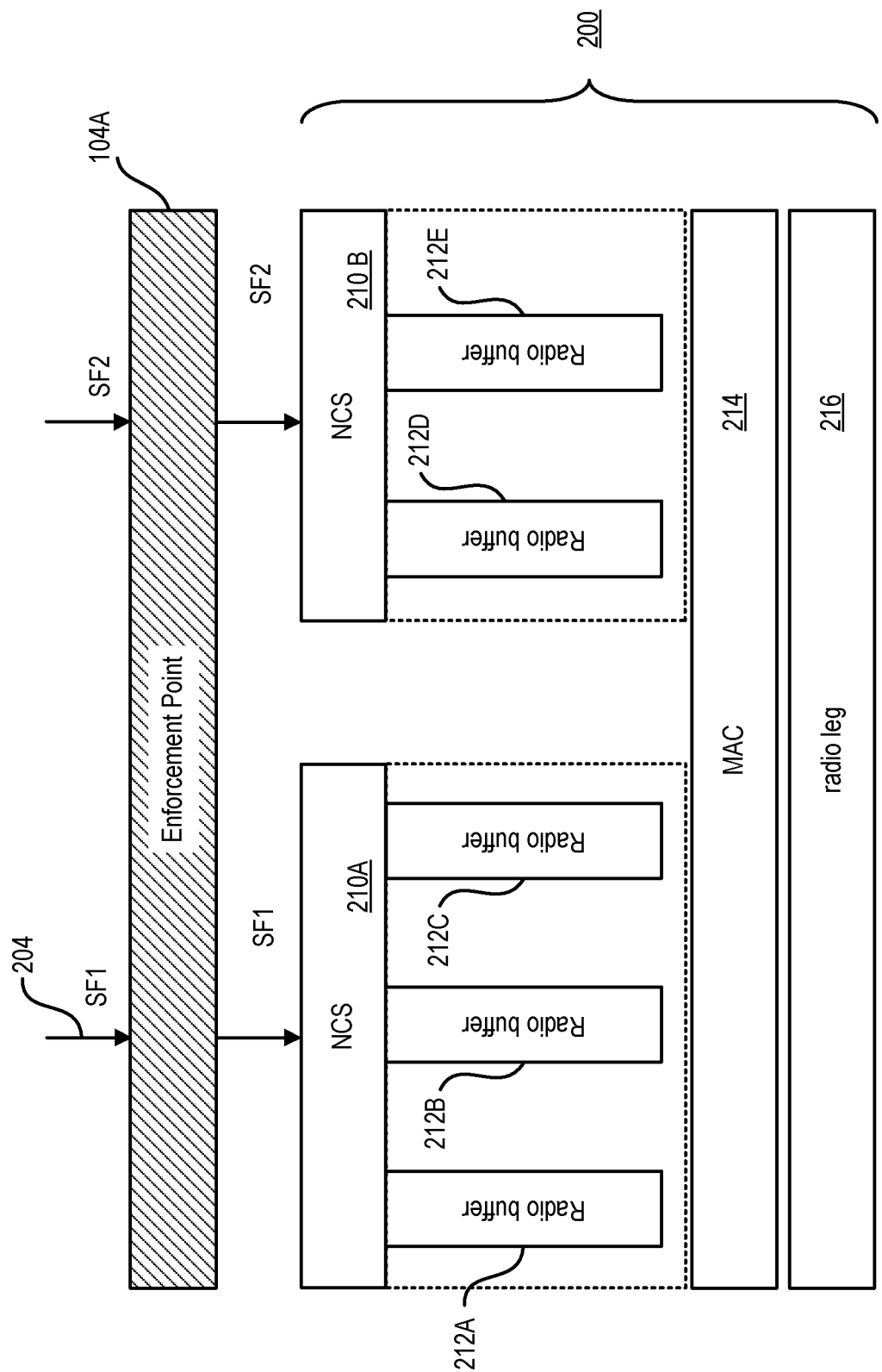
FIG. 2 depicts an example of an enforcement point and a radio including radio buffers, in accordance with some example embodiments.

FIG. 2 depicts an example of a radio protocol stack 200 for a service flow, in accordance with some example embodiments. The radio protocol stack 200 may be implemented at a radio (e.g., a base station, access point, and/or the like) interfacing a wireless network. In the example of FIG. 2, each service flow, such as service flow 204, may be handled by an enforcement point such as enforcement point 104A. Each NCS (network convergence sub-layer of L2) 210A-B (NCS) may include a certain quantity of radio buffers 212A-E over a media access control layer 214 and a radio link layer (for example, a radio resource management (RRM) layer) 216. NCS refers to a radio function or radio stack that may include one or more radio protocols or associated mechanisms (e.g., a radio scheduler, radio resource management, and/or the like). The NCS may be implemented as an upper level radio protocol (which may provide in 5G some of the functions associated with the packet data convergence protocol now found in LTE). The NCS may thus provide a user-plane radio stack, while the RRM may provide a control-plane radio stack. Moreover, the certain quantity of radio buffers may be predetermined, although the quantity may be determined dynamically as well. Moreover, each of the radio buffers may have configurable (or programmable) service parameters, such as QoS parameters, scheduler disciplines, and/or the like, to provide a certain QoS or QoE treatment to packets in a given service flow and, more particularly, a given subservice flow. To enable a given subservice flow to be handled with a certain QoS or QoE treatment configured at a certain radio buffer, the enforcement point 104A may communicate service flow and/or subservice flow related information to the radio protocol stack 200. Moreover, the enforcement point may control which packets are mapped to which radio buffer to enable the given subservice flow to be handled with a certain QoS or QoE treatment.

Sub-service flow traffic and service differentiation having a QoS/QoE treatment granularity finer than the service flow-level may be implemented within radio stack 200 such as a 5G radio stack for example, through the use of a plurality of radio buffers within a single NCS entity. To enable QoS/QoE management, user-plane subservice flows within the service may be mapped to the plurality of radio buffers, and this mapping may be managed according to the application sessions and their QoS and/or QoE requirements. To enable QoS/QoE management, the radio buffers may be dynamically programmed according to the service requirements of the corresponding traffic mix. However, the radio stack 200 may not (due to its location and functionality, for example) have a sufficient level of insight (e.g., with respect to application sessions, QoS/QoE, and/or the like), and may not have mechanisms (e.g., higher level application scheduling instead of transmission time interval (TTI) level physical radio resource allocation and frame/packet scheduling) to enable QoS/QoE management. Accordingly, the enforcement point may, in accordance with some example embodiments, provide a so-called overlay entity having real-time insight into the applications, flows, QoS/QoE requirements, and/or the like which may be required to provide the indications on the service parameters and multiplexing to the NCS layer (e.g., to program the radio buffers dynamically in real time for certain subservice flows). The interaction between the enforcement point 104A and the NCS layer 210A may include the configuration of the certain interfaces, information elements, procedures, and roles.

In some example embodiments, there may be provided configurations, implementations, and/or definitions for subservice flow management logic, the attributes, and/or parameters associated with a subservice flow, related interfaces, and signaling for subservice flows, and/or the mapping of subservice flows to radio buffers.

In some example embodiments, subservice flow management may provide at least an enforcement point configured to provide an initiator or certain subservice flow actions and/or controller for subservice flow management. In some example embodiments, subservice flow management may provide, at a given radio, a radio stack 200 configuration for the NCS, radio resources, and/or the like. Moreover, the radio stack may provide an interpreter role (e.g., the radio stack may execute actions or commands initiated by the enforcement point as part of subservice flow management.

In some example embodiments, the communication between the enforcement point 104A and the radio stack including the NCS 210A may have a granularity of subservice flow. Data bearer granularity (as found in traditional LTE) may provide traffic (which is generated by each simultaneous application run by a user equipment) multiplexed (without differentiating between the packets) into the same bearer. The bearer in this case may be associated with a single logical channel and a single buffer at the radio stack, meaning that all application traffic of the same user equipment (UE) are multiplexed and (in case of radio congestion) queued/delayed in the same buffer. This may lead to suboptimal QoE as a high volume but not important application (such as a software update) may cause a long queue introducing high delay for another interactive application such as chat/web. In the case of subservice flow granularity, it may enable further segmentation among the traffic generated by the same UE. For example, the segmentation may include per-application separation, so that each application has its one or more subservice flows, or each multiplex of applications sharing the same kind of requirements (e.g., all are latency sensitive, or all are bandwidth intensive but not latency sensitive) may be given a separate subservice flow. The creation/configuration of the subservice flows may be performed by the enforcement point (along with the detection and decision of what traffic is to be separated into a subservice flow, and what the QoS/QoE parameters of the subservice flow should be).

Furthermore, the enforcement point may initiate actions such as establishment, modification, and/or termination of one or more subservice flows dynamically, without a predefined limit on the quantity of subservice flows per service flow. These subservice management actions may be initiated to enforce policies received during a service or subservice flow establishment procedure. For each subservice flow, the enforcement point may define a set (e.g., one or more) attributes describing a required (e.g., needed, requested, target, and/or the like) user-plane service for the corresponding traffic (which may be associated with a session of an application). Additionally or alternatively, the enforcement point may, in accordance with some example embodiments, assign which subservice flows may be mapped to the same radio buffer at the radio stack (e.g., due to a fixed or a limited quantity of radio buffers). To perform the mapping, the enforcement point may be aware of the quantity of radio buffers for each service flow controlling a subservice flow and/or radio buffer mapping.

In some example embodiments, the subservice management actions and the related attributes may be communicated to, or negotiated with, the radio stack 200 including the NCS 210A/radio resource management (RRM) 216 RRM 216 may provide control plane functionality to the radio (e.g., creating a new radio bearer, instantiating and configuring the radio protocol layer entities, and/or the like). Moreover, this communication or negotiation may be on a per-service flow level for each subservice flow. The NCS 210A may be configured to modulate or vary its internal packet processing mechanism (e.g., through queuing and scheduling) based on the subservice flow level information. The radio scheduler may operate by assigning priorities to the radio buffers in each scheduling time interval and allocating the radio resources (e.g., physical resource blocks such as frequency bands) to the buffers. The data may be transferred from the buffers to the user equipment over the allocated frequency band(s). The scheduler may normally calculate the per-buffer priority based on radio specific terms, such as the radio channel quality of the user (e.g., the better the quality, the higher the priority), and take into account the available data and throughput history of the bearer. The aforementioned modulating refers to the scheduler taking into account the radio specific priority calculation and account additional (e.g., as QoS/QoE related) factors so that prioritizing radio buffers that require more service from QoS/QoE point of view may be achieved (or facilitated) through the radio scheduler itself.

Figure 3:
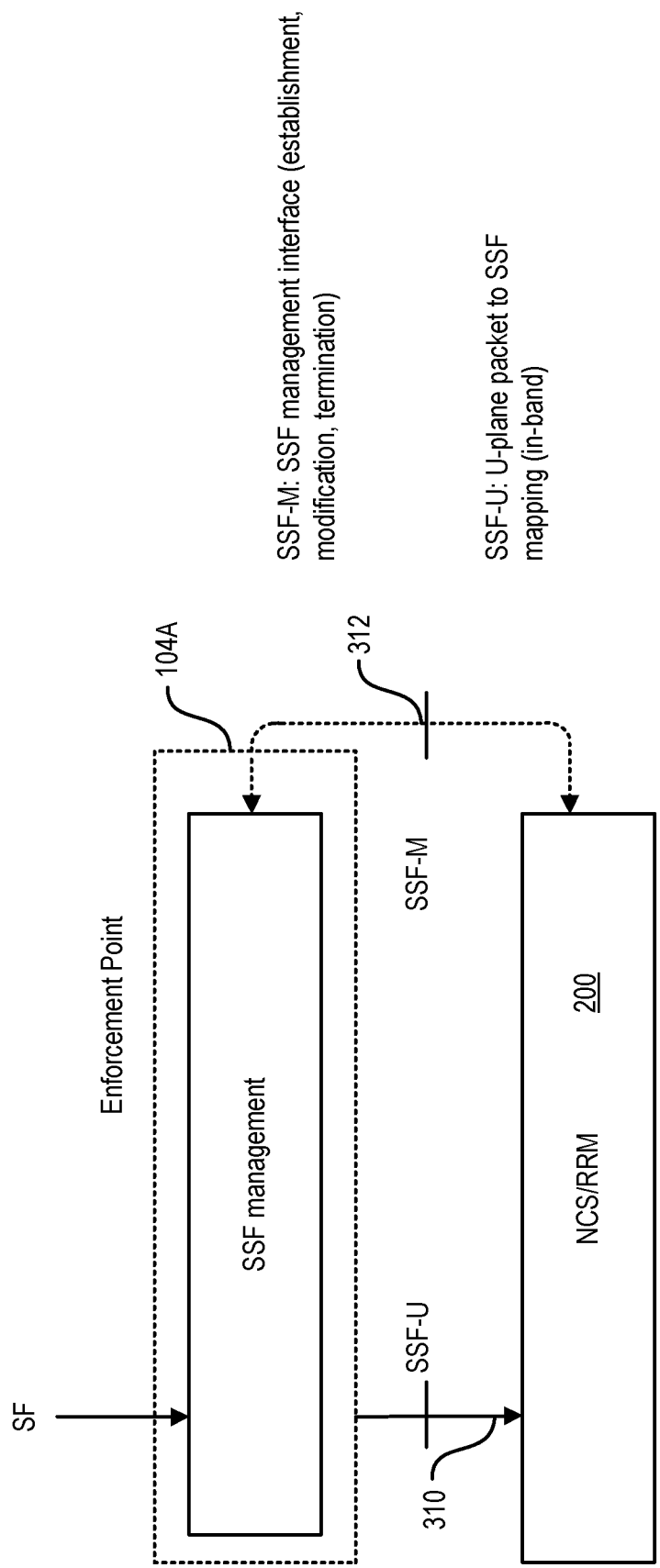
FIG. 3 depicts examples of subservice flow management interfaces, in accordance with some example embodiments.

FIG. 3 depicts an example of a block diagram for subservice flow management, in accordance with some example embodiments. FIG. 3 includes a subservice flow user interface (SSF-U) 310 and a subservice flow management interface (SSF-M) 312. Within the context of subservice flow management, these two interfaces 310/312 may be provided between enforcement point 104A and the radio protocol stack 200 (e.g., NCS/RRM). The SSF-M interface 312 may provide a signaling interface for exchanging subservice flow management information (e.g., creation, modification, termination, and/or related actions). The SSF-U interface 310 may provide a pseudo-interface that indicates the mapping of packets to individual subservice flows directly on the user-plane, so that the enforcement point may indicate the subservice flow membership of each packet to the NCS. The pseudo interface may refer to an in-band interface that can be efficiently implemented by piggybacking information to (or marking, or tunneling) user-plane packets, instead of establishing a dedicated communication channel with dedicated messages exchanged separately from the user-plane packets. When there is only a core side enforcement point such as enforcement point 104A, it may be configured to terminate the SSF management interfaces such as the SSF-U 310 and SSF-M 312.

Figure 4A:
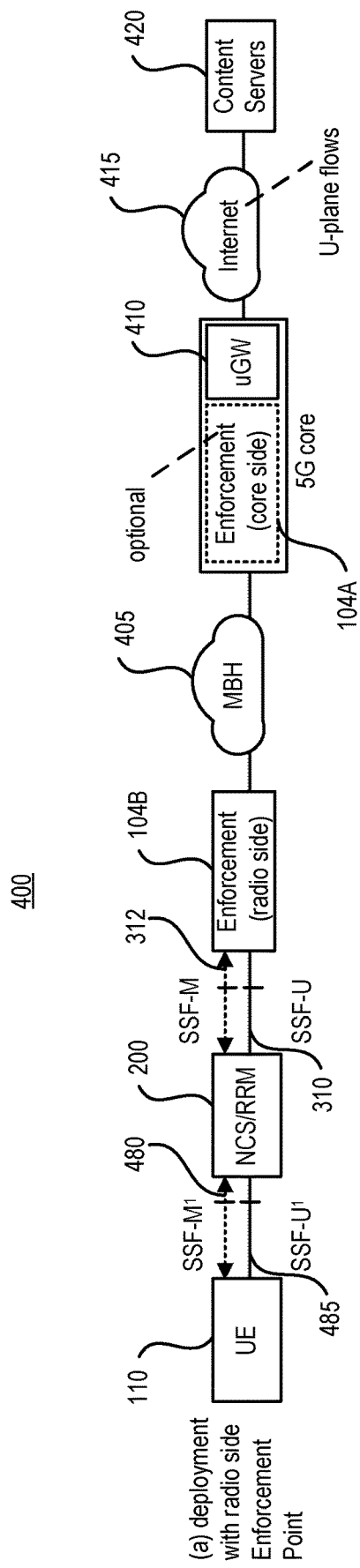
FIGS. 4A-B depict examples of systems including subservice flow management, in accordance with some example embodiments.

FIG. 4A depicts an example of a system 400 configured for subservice flow management, in accordance with some example embodiments.

The system 400 may include a user equipment 110 receiving (and/or transmitting) user-plane flows from (and/or to) content servers 420 coupled to a network such as the internet 415. The system 400 may also include a user gateway (uGW) 410 coupled to the internet 415 for handling the user-plane traffic. The user gateway 410 may be coupled to a core-side enforcement point 104A coupled via a backhaul link or network 405 to a radio side enforcement point 104B. In the example of FIG. 4A, the radio side terminates the SSF-U 310 interface and SSF-M interface 312 to the radio stack 200. When UE 110 supports subservice flow level traffic differentiation, the SSF-M and SSF-U interfaces may be extended 480 and 485 over the radio interface to the user equipment 110. Specifically, the UE may have knowledge on the subservice flows (with the purpose to perform QoS/QoE related prioritization or management at the UE for example), and this knowledge (or information) may require the UE to be a part of the subservice flow management procedures. For example, the same subservice flow management interfaces may be implemented by the UE as are implemented at the enforcement point. When this is the case, the radio stack (NCS/RRM) may forward (e.g., after adaptation) the subservice flow management commands received from the enforcement point to the UE.

Figure 4B:
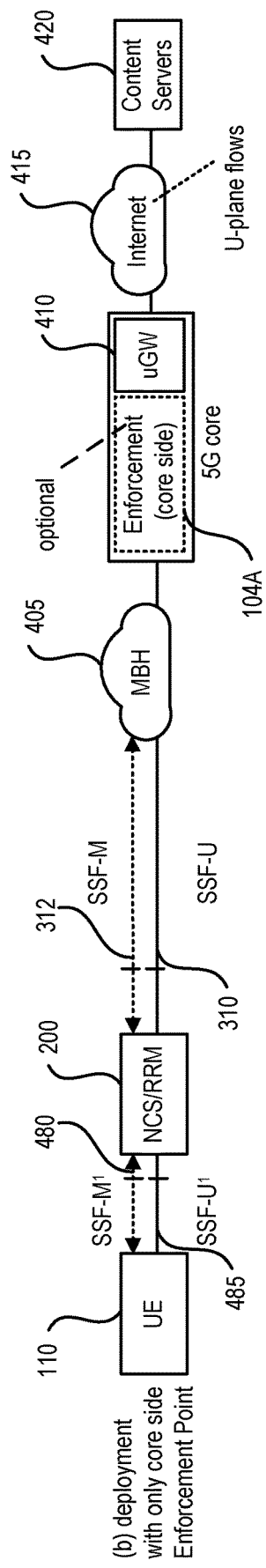

FIG. 4B depicts a different configuration of system 400 in which the core-side enforcement point 104A terminates the SSF-U 310 interface and SSF-M interface 312 to the radio stack 200. At FIG. 4B, the core side enforcement point terminates, or provides, the SSF-U 310 interface and SSF-M interface 312.

Figure 5:
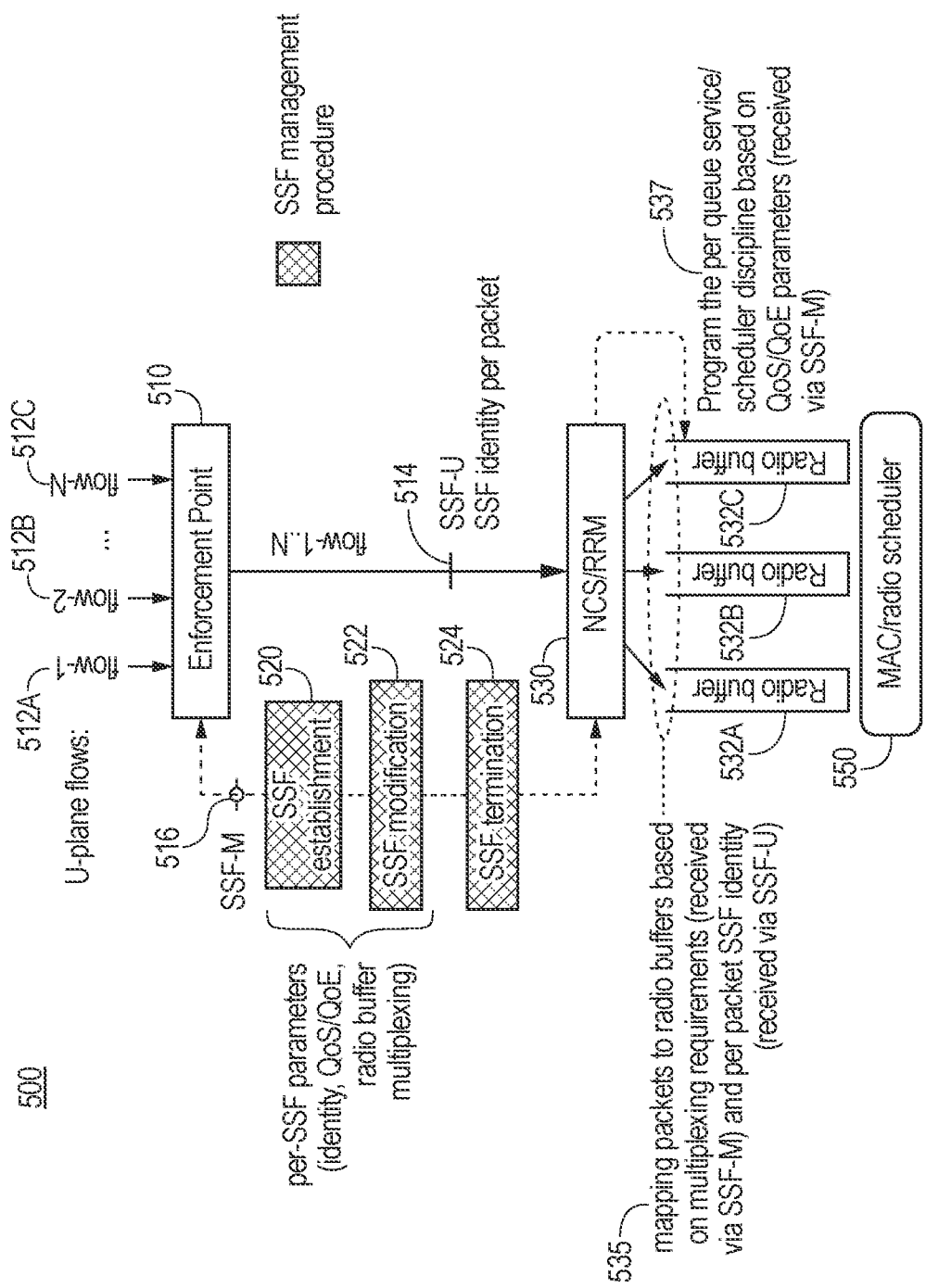
FIG. 5 depicts communications between an enforcement point and the radio based on subservice flow management procedures, in accordance with some example embodiments.

FIG. 5 depicts a system 500 for subservice flow management, in accordance with some example embodiments. Subservice flows may be carried between the enforcement point 510 and the NCS 530.

The system 500 may include an enforcement point 510 receiving one or more flows 512A-C. This enforcement point 510 may, in accordance with some example embodiments, include a SSF-U interface 514 and a SSF-M interface 516. The SSF-M interface 516 may be used for certain actions such as subservice flow establishment 520, subservice flow modification 522, and/or subservice flow termination 524. As noted above, one or more radio buffers 532A-C may be established, so that the packets can be mapped 535 to the appropriate radio buffer 532A-C at the radio implementing the NCS 530, radio buffers 532A-C, MAC/radio scheduler 550, and/or the like. As noted above, one or more radio buffers 532A-C may be programmed or configured 537, so that each queue at the radio buffer is configured to provide a certain QoE/QoS treatment for a given subservice flow in that buffer.

A subservice flow may carry one or more subservice flow attributes (referred to herein as SSF attributes). In some example embodiments, the subservice flow may include, as an attribute, a unique identity (SSF ID) identifying the subservice flow on the SSF-M 516 and SSF-U 514 interfaces within a given service flow. Alternatively or additionally, the subservice flow may include, as an attribute, a subservice flow multiplexing group (MUX ID) indicating which subservice flows should be multiplexed into the same radio buffer in the radio stack. Alternatively or additionally, the subservice flow may include, as an attribute, a set of service parameters such as a set of QoS parameters describing the user-plane treatment packets should receive on an abstraction level understood by the radio scheduler (e.g., scheduler parameters, weights, and/or the like.). The service parameters may indicate an aggregate or compound requirement for some, if not all, the subservice flows that are multiplexed in the same radio buffer. For example, subservice flow's having the same MUX ID may all be placed in the same radio buffer such as radio buffer 532A and thus receive the same QoS and/or QoE treatment in accordance with the corresponding service parameters for that subservice flow.

In some example embodiments, the SSF ID may be implemented as a constant value (or attribute) throughout the lifetime of a given subservice flow. Other attributes may, however, have attributes that may change during the life of the subservice flow. These other attributes may be changed by for example the enforcement point in a dynamic manner. For example, the enforcement point may configure or provide the service parameters. When multiple subservice flows are multiplexed to the same radio buffer, the enforcement point may perform service parameter composition to derive the service parameters to reflect the required treatment of the superposition of the multiplexed subservice flows.

In some example embodiments, the SSF-M interface 516 may be configured to negotiate subservice flow establishment 520, SSF modification 522, and/or SSF termination 524 actions between the enforcement point 510 and the NCS/RRM 530. When the enforcement point decides that a given set of user-plane flows needs or requires differentiated QoS/QoE treatment via a separate service flow, the enforcement point may trigger subservice flow establishment. The enforcement point may trigger a subservice flow modification, when enforcement point decides for example that (1) the service parameters of a given subservice flow may require modification (e.g., to maintain good customer experience) and/or (2) the subservice flow to the radio buffer multiplexing should, or needs to, be changed. The enforcement point may trigger a subservice flow termination, when for example the enforcement point detects the end of corresponding traffic for any reason.

In some example embodiments, the SSF-U interface 514 may map each user-plane packet to a certain (or unique) subservice flow as the user-plane packets are passed from the enforcement point 510 to the radio stack 530. To that end, the same SSF ID that was allocated during subservice flow establishment procedure may be included in (or attached to) the user-plane packet(s).

The enforcement point 510 may provide subservice flow management, which may include forming sub service flows from a given service flow. For example, each application session may be assigned to a specific subservice flow (which, in turn, may belong to a service flow). During service flow establishment, a default subservice flow may be created automatically (e.g., programmatically) to provide a default or so-called "catch-all" subservice flow for all traffic that does not require dedicated service within the service flow. When this is the case, no special SSF ID may be needed to be reserved as each subservice flow is an explicitly established subservice flow. Alternatively or additionally, no default subservice flows may be created. For example, traffic may be associated directly with the service flow itself. A subservice flow may only be created, when the enforcement point detects that application sessions require a dedicated subservice flow level treatment or differentiation. At the NCS layer 530, a default radio buffer may be implemented that is programmed (e.g., by default) to handle some, if not all, traffic not marked on the SSF-U interface as belonging to a specific subservice flow. In this case, a special SSF ID (e.g., zero, although other values may be used as well) may be reserved to refer to the default radio buffer on the SSF-M 516 and/or SSF-U 514 interfaces.

The enforcement point 510 may obtain the QoS and/or QoE management policies upon service flow establishment. The policies may define the default service parameters to be applied to a service flow and the policies for additional QoS/QoE differentiation within the service flow. The enforcement point may monitor the user-plane packets to detect flows and application sessions requiring dedicated service. In the subservice flow management context, the enforcement point may be configured to automatically define the QoE/QoS parameters and, based on that, define the service parameters for each subservice flow during subservice flow establishment or subservice flow modification.

Figure 6:
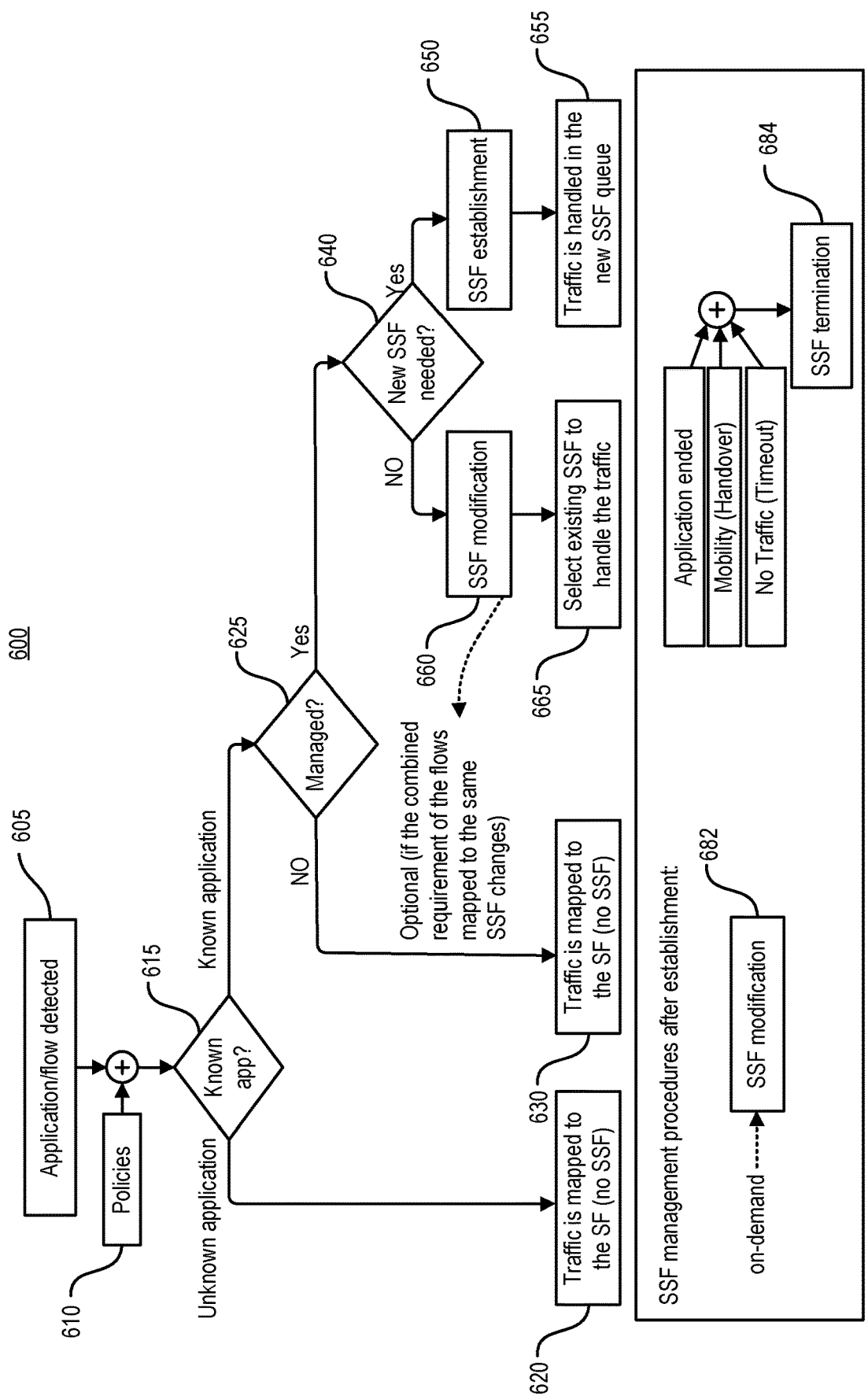
FIG. 6 depicts an example of a process for subservice flow management, in accordance with some example embodiments.

FIG. 6 depicts a process 600 for subservice flow management, in accordance with some example embodiments. Process 600 may, in accordance with some example embodiments, be performed by an enforcement point.

At 605, the enforcement point 510 may detect an application session or a flow of traffic for an application session, in accordance with some example embodiments. For example, the enforcement point 510 may monitor user-plane traffic for (or receive an indication of) the start of a session of an application.

At 610, the enforcement point 510 may receive one or more policies, in accordance with some example embodiments. The policies may be received form a policy server 102, and may be related to the QoS and/or QoE treatment of a service flow or subservice flow. The policy may be provided by the network operator or a corresponding network node, and/or the policy may be derived by the enforcement point individually and autonomously.

If the application or session is unknown or unidentified, the enforcement point 510 may map the traffic for the application session to a service flow (rather than a subservice flow), in accordance with some example embodiments (615 and 620). For example, if the traffic corresponds to a virtual private network in which the underlying user plane data is encrypted and there is no policy to handle the VPN in a particular way, the enforcement point may map the data traffic to a service flow, which may be a default service flow having certain treatment for the virtual private network traffic. In another example, if the application is not recognized by the enforcement point or it has not received an indication of the application identity from an external entity, the enforcement point may not define a dedicated subservice flow for the application but map its traffic directly to the service flow.

If the application or session is known or identified, the enforcement point 510 may determine, at 625, whether the user-plane traffic for the application session is managed, in accordance with some example embodiments. If the traffic is unmanaged (no at 625), the enforcement point may map, at 630, the traffic for the application session to a service flow but not a subservice flow, in accordance with some example embodiments. Some traffic may be identified but unmanaged traffic (no at 625). For example, traffic that falls under the best effort category may be identified but treated as unmanaged at 625. When unknown and unmanaged traffic needs to be differentiated (policy), the enforcement point may at 665 select or establish a subservice flow to handle some, if not all, unmanaged traffic (e.g., if a subservice flow already exists, the traffic may be mapped to into the subservice flow). Alternatively or additionally, the distinction may be enforced internally by the enforcement point without the need to establish a subservice flow, in which case unmanaged traffic is not mapped to any subservice. When no differentiation is needed between unknown and unmanaged traffic, the enforcement point may apply a default service with no subservice flow.

If the traffic is managed (yes at 625), the enforcement point may map determine, at 640, whether another or a new subservice flow treatment is needed for the detected application session, in accordance with some example embodiments. For example, a dedicated subservice flow may be established, when the traffic requires specific service according to the policies received at 610. The service parameters of the subservice flow may be derived from the QoS/QoE requirements of the corresponding traffic. Sessions with similar QoS/QoE requirements may be grouped into the same subservice flow to reduce the number of subservice flows and the subservice flow management overhead. When that is the case, the service parameters of the subservice flow may be derived from the composite QoS/QoE requirements of some, if not all, sessions/flows mapped to the same subservice flow.

If another or a new subservice flow treatment is needed for the detected application session (yes at 640), the enforcement point may establish at 650 a subservice flow, in accordance with some example embodiments. For example, if the detected session needs or should be provided a different treatment (which may not be available or established at the radio) with respect to QoS and/or QoE treatment, the enforcement point may establish a new subservice flow to handle that treatment. The established subservice follow may allow, at 655, the traffic for the detected application session to be handled in the new subservice flow radio buffer queue (and thus receive the QoS/QoE treatment configured for the buffer queue).

If another or a new subservice flow treatment is not needed for the detected application session (yes at 640), the enforcement point may modify at 660 an existing subservice flow, in accordance with some example embodiments. For example, if an existing subservice flow being carried by an already established radio buffer can be modified to carry the newly detected flow treatment, then a new radio buffer having a new subservice flow treatment does not need to be created. To that end, the enforcement point may select at 665 an existing subservice flow and modify the selected subservice flow to include the detected application session.

For managed traffic, the enforcement point may detect, at 682, whether subservice flow service parameters should be changed (e.g., due to change in the QoS/QoE requirements of the application sessions). If so, the enforcement point may initiate a subservice flow modification.

The enforcement point may, at 684, terminate an subservice flow when the corresponding traffic is terminated due to for ending of the application session, a handover, and/or a timeout (e.g., the user equipment is not available).

In some example embodiments, the quantity of radio buffers (e.g., radio buffers 532A-C) may be a limited to a certain quantity. When this is the case, multiple subservice flows may be multiplexed into the same radio buffer, and the service of the radio buffer may satisfy the requirement of the group or aggregate of the subservice flows (e.g., taking into account the needs of some if not all of the individual subservice flows). Defining the right service parameters for the radio buffer (which includes multiple subservice flows multiplexed together) may include composing or determining one or more service parameters. For latency, delay, loss type of QoS requirements, the strictest one (e.g., lowest value) of the individual subservice flows requirements may be used as a valid composite parameter for the group of subservice flows. For throughput or bandwidth type of service requirements, the composition may include taking the sum of the per subservice flow requirements. Although this may yield a bandwidth value that does not take into account possible multiplexing gains, a more optimized bandwidth definition may be performed as well (in which case the enforcement point may need to be aware of traffic pattern generated by each subservice flow to determine a composite that may be lower than the sum). The service composition may be performed by the enforcement point due to the detailed application, content, QoE, and/or network context information available to the enforcement point.

To illustrate further, the enforcement point may detect the initiation of a session of an application by directly monitoring the user plane traffic (and/or receiving an indication from another node that monitors the user plane traffic). The enforcement point may then determine whether the session needs a new subservice flow to be established. For example, if the session needs a certain quality of service treatment and/or quality of experience treatment then the enforcement point may choose to trigger another radio buffer to be established to handle a subservice flow for the session. In this way, the subservice flow can provide a different flow treatment when compared to for example the service flow. Next, the enforcement point may send an indication, such as a message, to a radio to enable the radio to establish a radio buffer to handle the new subservice flow, when the new subservice flow needs to be established. The enforcement point may also send parameter information to the radio to enable the radio to configure the service parameter(s) of the radio buffer. Next, the enforcement point may user-plane data associated with the session to the radio including a subservice flow identifier. The subservice flow identifier maps the subservice flow to the established radio buffer.

The indication of subservice flows multiplexing from the enforcement point 510 to the radio layer 530 may be performed via the per subservice flows MUX ID attribute, in accordance with some example embodiments. For example, the MUX ID may take a value of an integer in a range of [1 ... NQ], wherein NQ is one less than the number of radio buffers within the service (one less as one radio buffer is reserved for default service). Each subservice flow having the same MUX ID may thus be mapped into the same radio buffer. The MUX IDs may not be bound to specific radio buffer instances (e.g., they only indicate which subservice flows should be multiplexed together but not to which specific radio buffer to use). The radio stack may be configured to select between radio buffers.

In some example embodiments, subservice flow multiplexing may be performed by linking the SSF ID with MUX ID in the way that a group of SSF IDs corresponds to one MUX ID (in which case the MUX ID can be implicitly indicated by the SSF ID). In this implementation, the NCS/RRM 530 may not need to indicate MUX ID attribute in each SSF establishment/modification signaling message. Instead, the NCS/RRM may be configured by the enforcement point with the static or semi-static SSF ID and MUX ID mapping rule, so that the NCS/RRM can derive the MUX ID based on the SSF ID.

Although some of the examples described herein refer to a predetermined quantity of radio buffers, in some embodiments radio buffers may be instantiated, as noted, dynamically (e.g., when needed, on-the-fly during the lifetime of a service flow). When this is the case, the enforcement point may be configured to maintain a one-to-one mapping between subservice flows and radio buffers (e.g., the MUX ID equals the SSF ID for each subservice flow) and using no service parameter composition.

In some example embodiments, the enforcement point may be configured to enforce a mapping between a subservice flows and a radio buffer. For example, when the radio flows are extended up to the enforcement point, the enforcement point may effectively forward packets into specific radio buffers. When this is the case, the enforcement point may establish no more subservice flows than the quantity of available radio buffers. As such, the enforcement point may internally multiplex user-plane application sessions into the subservice flows, and may configure the subservice flow service parameters according to the compound requirements of the subservice traffic mix. Here, the MUX ID may be the same or derived from the SSF ID (e.g., each subservice flow may have its own MUX group).

In some example embodiments, the SSF-M interface 516 may include dedicated control-plane signaling and/or in-band user-plane signaling. In the case of control-plane signaling, a reliable message transfer may be provided for dedicated subservice flow signaling. Control-plane signaling may enable an independence with respect to the amount and structure of information that can be carried by the control-plane. Control-plane signaling may also enable ACK/NACK, retry, failure, fallback, and/or the like mechanisms to enhance signaling reliability. In the case of user-plane signaling, the subservice flow signaling may be carried by user-plane traffic packets or frames by for example including an information element(s) to the packets or frames.

Figure 7:
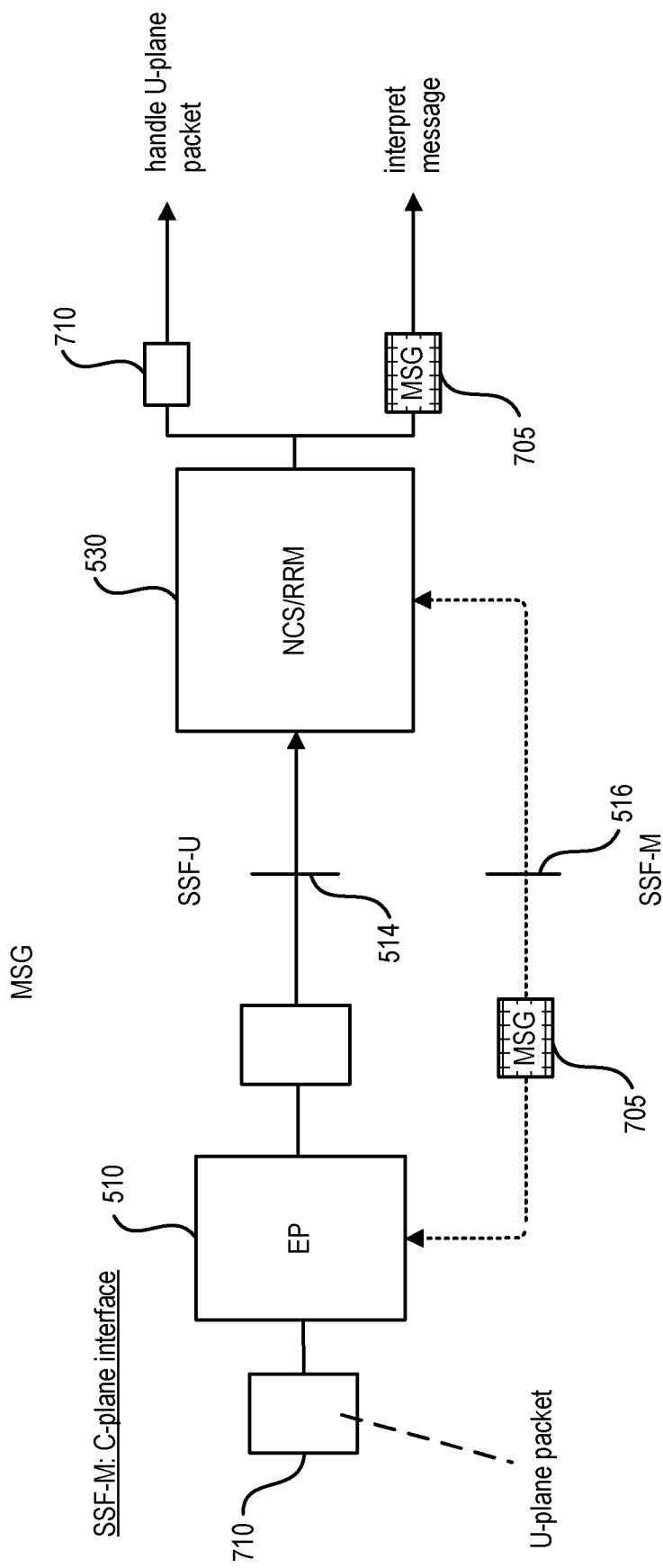
FIG. 7 depicts examples subservice management interfaces, in accordance with some example embodiments.

FIG. 7 depicts an example of a SSF-M interface configured to operate via the control-plane, in accordance with some example embodiments. As shown, control-planning signaling messages 705 may be carried via dedicated signaling that is separate from the user-plane traffic 710.

Figure 8:
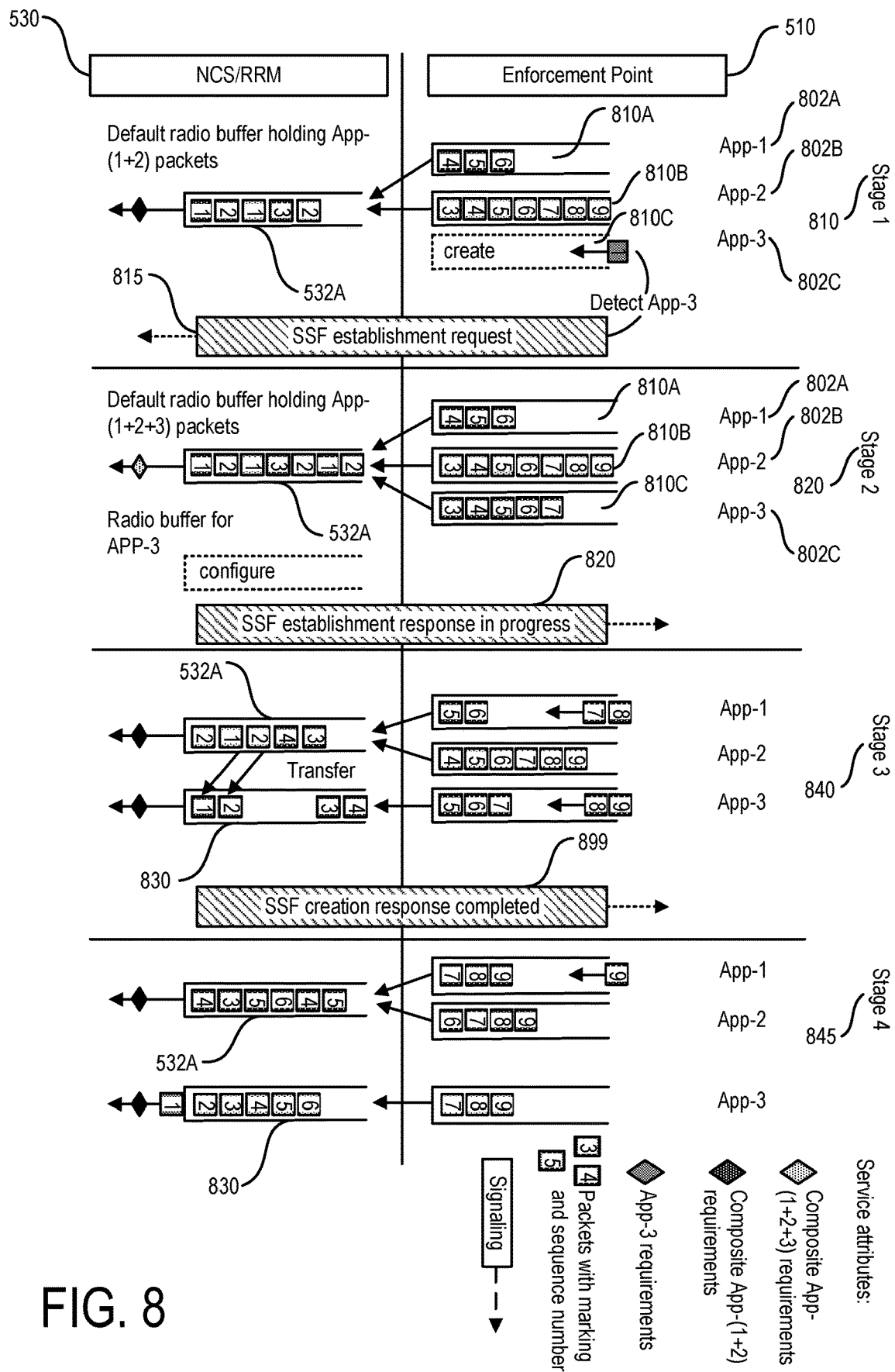
FIG. 8 depicts an example of a successful subservice flow establishment, in accordance with some example embodiments.

FIG. 8 depicts an example process showing the stages of a successful subservice flow establishment, in accordance with some example embodiments.

Suppose two application sessions such as a first application 802A and a second application 802B are being handled in different buffers at the enforcement point. At the first stage 810, these two buffers may be mapped to the same (default) radio buffer 532A (e.g., they have no dedicated subservice flows). When a third application session 802C is detected by the enforcement point, the enforcement point may determine a need for a dedicated subservice flow treatment. As such, the enforcement point may send a subservice flow establishment request message 815 to the radio including NCS/RRM 530.

During the second stage 820, the packets generated by the third application 802C may be mapped to the default radio buffer 832A, and the radio buffer's service parameters may be elevated to represent the compound requirements of all three application sessions 802A-C. The packets associated with the third application 802C may indicate on the user-plane as being part of the new subservice flow (the mechanism may be part of the SSF-U interface). The radio including NCS/RRM 530 may acknowledge, at 820, that the subservice flow establishment is valid with the requested parameters and that the subservice flow is ongoing. When the radio has prepared the dedicated buffer 830 for the new subservice flow, the radio including NCS/RRM 530 may transfer the packets from the default buffer 532A (if any) to the dedicated buffer 830 as shown at stage three 840. The radio including NCS/RRM 530 may signal the enforcement point with an indication such as message 899 that the buffer creation 830 is complete. At stage 840, the service parameters of the default buffer may be changed back by the enforcement point to the compound service parameters of first application and the second application, whereas the service parameters of the new radio buffer 830 may be the ones of third application. The fourth stage 845 depicts the first and second applications being mapped to the default radio buffer, while the third application 802C is mapped to radio buffer 830.

Figure 9:
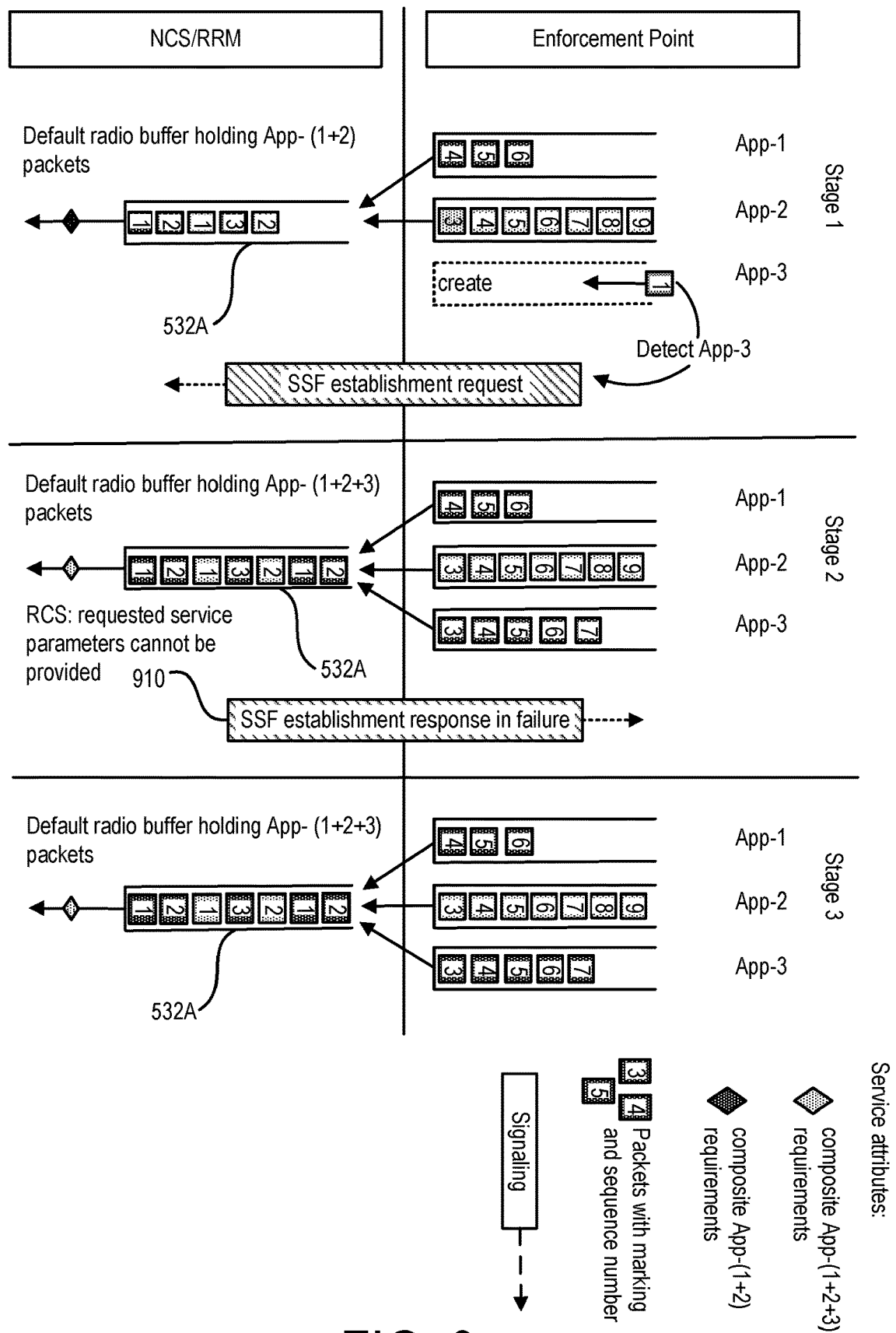
FIG. 9 depicts an example of a failure during a subservice flow establishment, in accordance with some example embodiments.

FIG. 9 depicts an example of an unsuccessful SSF establishment, in accordance with some example embodiments.

In case the NCS/RRM detects that the new SSF cannot be served with the requested service parameters (or another failure occurs), a failure indication message 910 may be sent to the enforcement point. Consequently, the traffic designated for the new subservice flow may instead be served by the default radio buffer 532A, in which case the enforcement point may elevate the service parameters of the buffer to the compound requirements of all application sessions.

Figure 10:
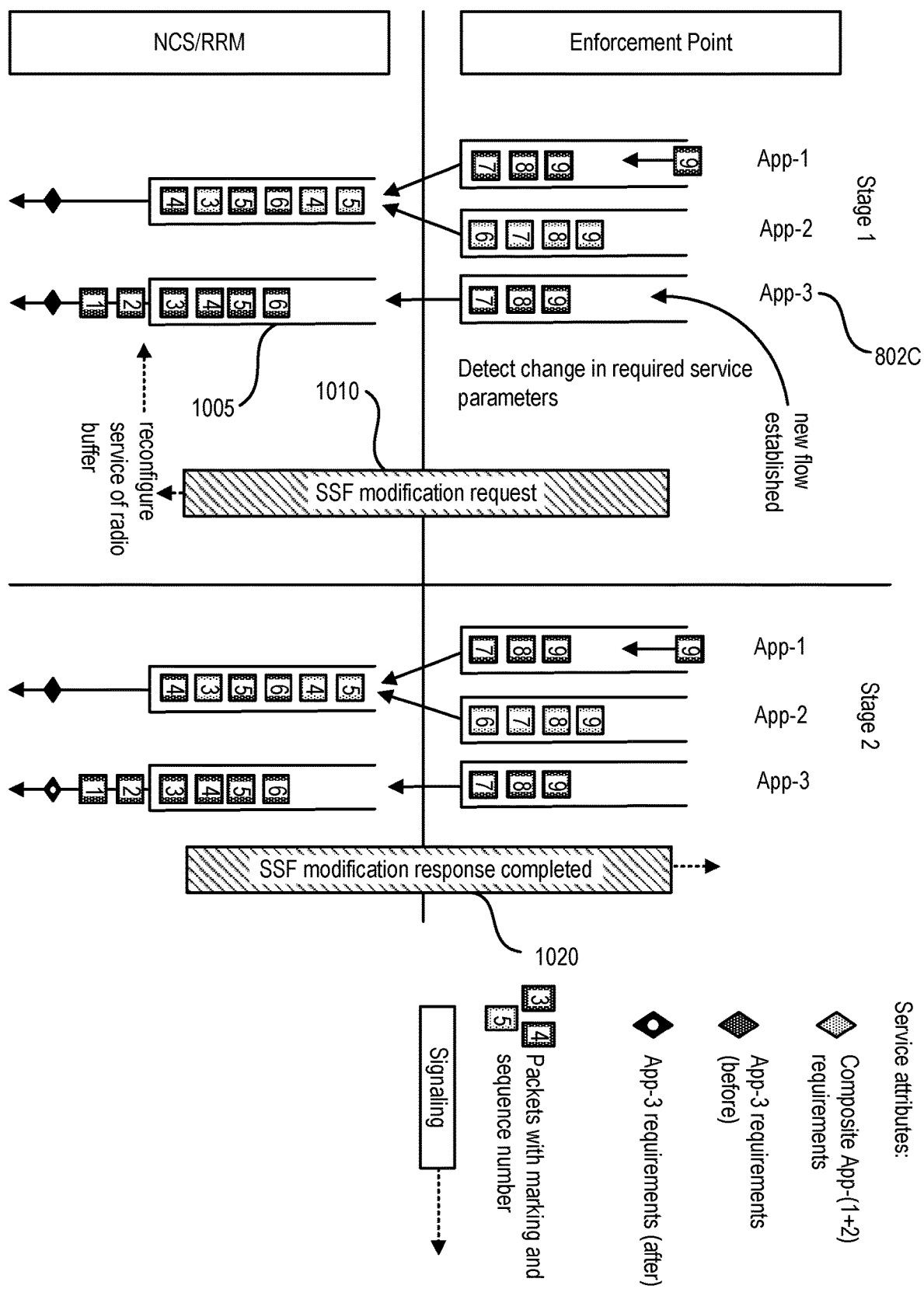
FIG. 10 depicts an example of a subservice flow modification, in accordance with some example embodiments.

FIG. 10 depicts an example of an SSF modification, in accordance with some example embodiments. When the new traffic flow for the third application 802C is detected and needs a different service flow treatment, the enforcement point may detect that a change in service parameters may be needed to reconfigure the radio buffer 1005. To that end, the enforcement point may send a subservice flow modification request 1010 to the radio including NCS/RRM 530. This message 1010 may trigger the radio including NCS/RRM 530 to modify the configuration of the radio buffer 1005 to accommodate the QoS/QoE treatment needed by the third application 802C. When the modification is completed, the radio may send a subservice flow response message at 1020.

Figure 11:
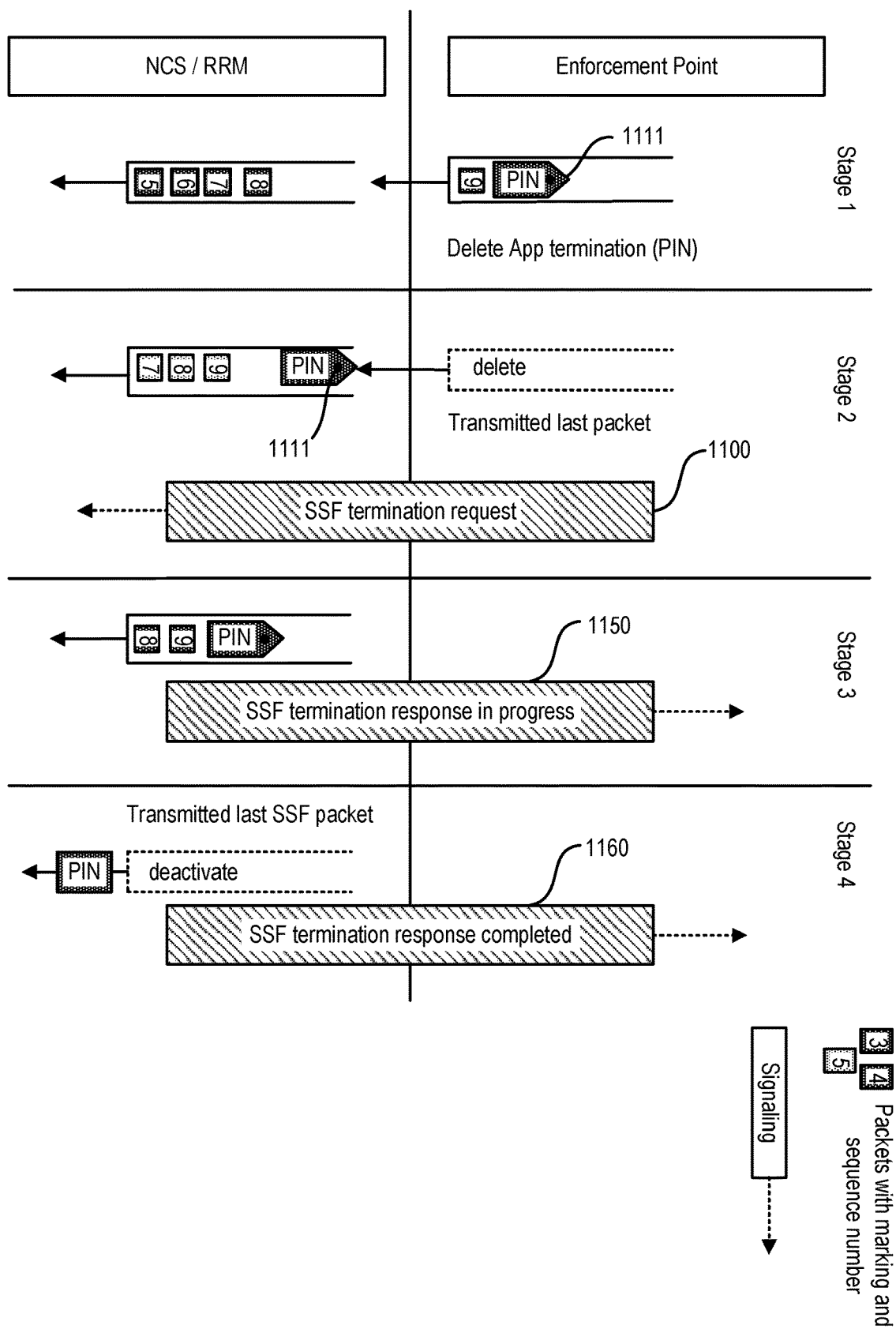
FIG. 11 depicts an example of a subservice flow termination, in accordance with some example embodiments.

FIG. 11 depicts an example of subservice flow termination, in accordance with some example embodiments. In some example embodiments, the enforcement point may terminate a subservice flow. To that end, the enforcement point notify the radio including the NCS/RRM about the subservice termination. This notification may take the form of a subservice flow termination request message 1100. The enforcement point may also mark the last user-plane packet 1111 it has forwarded with the subservice flow to the NCS so that the radio buffer is kept active until the last packet is successfully transmitted to the user equipment. FIG. 11 also shows that while the termination is in progress, the radio may send to the enforcement point a message 1150 indicating that the termination is in progress. When the termination is completed, the radio may send to the enforcement point a message 1160 indicating that the termination is complete.

Without in any way limiting the scope, interpretation, or application of the claims appearing herein, a technical effect of one or more of the example embodiments disclosed herein may include enhanced and more efficient handling of traffic.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit, a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any non-transitory computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

The different functions discussed herein may be performed in a different order and/or concurrently with each other. Furthermore, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications, which may be made without departing from the scope of the present invention as, defined in the appended claims. The term "based on" includes "based on at least."

What is claimed:

1. A method comprising:
   detecting, by an enforcement point of a core network, an initiation of a session of an application;
   determining, by the enforcement point, whether a new subservice flow needs to be established to enable, for the initiated session, a quality of service differentiation and/or a quality of experience differentiation;
   sending, by the enforcement, an indication to a radio to enable the radio to establish a radio buffer to handle the new subservice flow, when the new subservice flow needs to be established;
   sending, by the enforcement point, multiplexing group identification and service parameter information associated with the new subservice flow to the radio; and forwarding, by the enforcement point, user-plane data associated with the session to the radio including one or more subservice flow identifiers, to enable the radio to map the user-plane data to the radio buffer based at least in part on the multiplexing group identification, the service parameter information and the one or more subservice flow identifiers.

2. The method of claim 1, wherein the determining comprises:
determining whether the session requires a flow treatment that is different from what is available at one or more radio buffers at the radio and/or from what is provided by one or more established subservice flows.

3. The method of claim 1 further comprising:
sending, by the enforcement point, user plane data including a last packet indication to indicate to the radio that the radio buffer serving the session can be terminated.

4. The method of claim 1 further comprising:
marking, by the enforcement point, the user plane data of the session to include the one or more subservice flow identifiers to enable mapping subservice flows to the radio buffer.

5. The method of claim 1, wherein the one or more subservice flow identifiers include a unique identity to enable the radio to select one of a plurality of radio buffers to assign the user-plane data of the new subservice flow.

6. The method of claim 1 further comprising:
marking, by the enforcement point, the user plane data of the session to include a group identifier indicating to the radio which subservice flows are to be multiplexed together via a same radio buffer.

7. The method of claim 1, wherein the service parameter information includes one or more quality of service parameters and/or one or more quality of experience parameters.

8. The method of claim 1 further comprising:
providing, by the enforcement point, a composite parameter to the radio, wherein the composite parameter provides, for a group of subservice flows, a quality of service and/or a quality of experience parameter for the group of subservice flows.

9. An apparatus, comprising:
at least one processor; and
at least one memory including computer program code, the at least one memory and the computer program code configured to, with the at least one processor, cause the apparatus to perform at least the following:
detect, by the apparatus of a core network, an initiation of a session of an application;
determine, by the apparatus, whether a new subservice flow needs to be established to enable, for the initiated session, a quality of service differentiation and/or a quality of experience differentiation;
send, by the apparatus, an indication to a radio to enable the radio to establish a radio buffer to handle the new subservice flow, when the new subservice flow needs to be established;
send, by the enforcement point, multiplexing group identification and service parameter information associated with the new subservice flow to the radio; and
forward, by the enforcement point, user-plane data associated with the session to the radio including one or more subservice flow identifiers, to enable the radio to map the user-plane data to the radio buffer based at least in part on the multiplexing group identification, the service parameter information and the one or more subservice flow identifiers.

10. The apparatus of claim 9, wherein the apparatus is further caused to at least determine whether the session requires a flow treatment that is different from what is available at one or more radio buffers at the radio and/or from what is provided by one or more established subservice flows.

11. The apparatus of claim 9, wherein the apparatus is further caused to at least send an indication requesting the radio to terminate the radio buffer serving the session.

12. The apparatus of claim 9, wherein the apparatus is further caused to at least send user plane data including a last packet indication to indicate to the radio that the radio buffer serving the session can be terminated.

13. The apparatus of claim 9, wherein the apparatus is further caused to at least mark the user plane data of the session to include the one or more subservice flow identifiers to enable mapping subservice flows to the radio buffer.

14. The apparatus of claim 9, wherein the one or more subservice flow identifiers include a unique identity to enable the radio to select one of a plurality of radio buffers to assign the user-plane data of the new subservice flow.

15. The apparatus of claim 9, wherein the apparatus is further caused to at least mark the user plane data of the session to include a group identifier indicating to the radio which subservice flows are to be multiplexed together via a same radio buffer.

16. The apparatus of claim 9, wherein the service parameter information includes one or more quality of service parameters and/or one or more quality of experience parameters.

17. The apparatus of claim 9, wherein the service parameter information is carried to the radio via an in-band user plane interface at the apparatus.

18. The apparatus of claim 9, wherein the apparatus is further caused to at least provide a composite parameter to the radio, wherein the composite parameter provides, for a group of subservice flows, a quality of service and/or a quality of experience parameter for the group of subservice flows.

19. The apparatus of claim 9, wherein the apparatus comprises an enforcement point.

20. A non-transitory computer readable storage medium including program code which when executed by at least one processor causes operations comprising:
detecting, by an enforcement point of a core network, an initiation of a session of an application;
determining, by the enforcement point, whether a new subservice flow needs to be established to enable, for the initiated session, a quality of service differentiation and/or a quality of experience differentiation;
sending, by the enforcement point, an indication to a radio to enable the radio to establish a radio buffer to handle the new subservice flow, when the new subservice flow needs to be established;
sending, by the enforcement point, multiplexing group identification and service parameter information associated with the new subservice flow to the radio; and
forwarding, by the enforcement point, user-plane data associated with the session to the radio including one or more subservice flow identifiers, to enable the radio to map the user-plane data to the radio buffer based at least in part on the multiplexing group identification, the service parameter information and the one or more subservice flow identifiers.

* * * * *